May 29, 1928.
R. N. ALLEN
1,671,757
BOLT AND NUT ASSEMBLY
Filed Oct. 2, 1926
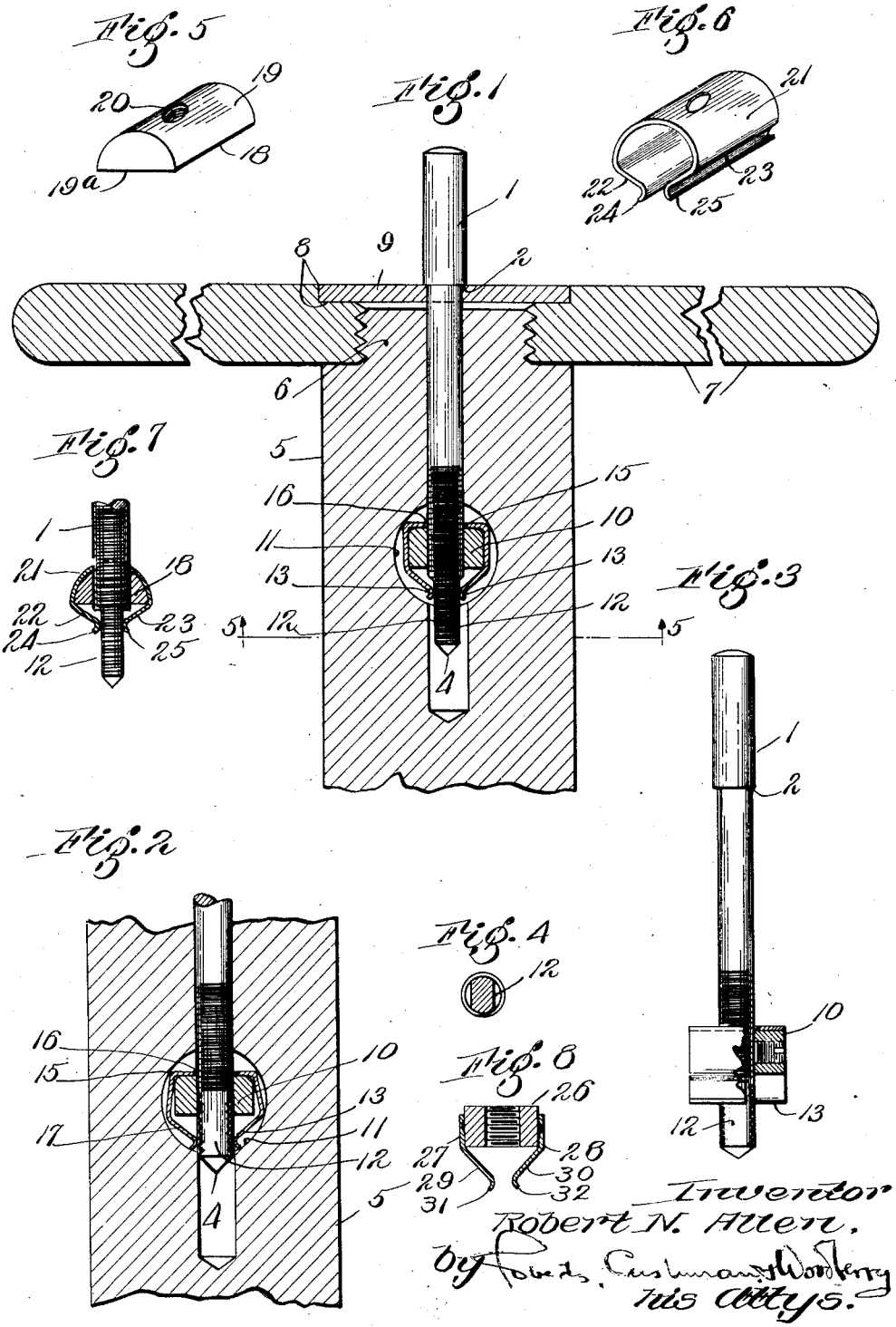

Patented May 29, 1928.

1,671,757

UNITED STATES PATENT OFFICE.

ROBERT N. ALLEN, OF METHUEN, MASSACHUSETTS, ASSIGNOR TO U. S. BOBBIN & SHUTTLE COMPANY, OF PROVIDENCE, RHODE ISLAND, A CORPORATION OF RHODE ISLAND.

BOLT AND NUT ASSEMBLY.

Application filed October 2, 1926. Serial No. 139,116.

This invention relates to restraining devices for a bolt or other screw-member adapted for many different uses. The invention will be explained for an illustrative example in connection with its application to a jack-spool for textile manufacturing purposes, in which it is desirable to restrain motion between the parts of the spool, as well as desirable to restrain relative motion between a removable projecting gudgeon or journal pin on the axis of the barrel of this spool and its means for engagement with the barrel of the spool, and at the same time to provide for tightening the assembly of related parts by tightening motion of a screw at one end of the gudgeon in a nut engaged with the barrel of the spool.

One object of the invention is thus to provide for restraint of effective motion between a screw-member, such as the illustrative gudgeon, or any other kind of bolt, and a nut associated with something to be restrained by the set-up adjustment of the bolt. A further object of the invention is to provide a device for restraining against change the adjusted relation of male and female screw-members which can readily be made in standardized form, and which can be released by sufficiently forceful relative rotative motion of the screw-members without having to interfere with the nut element.

In the accompanying drawings:

Fig. 1 is a longitudinal section of a portion of a jack-spool, showing the gudgeon and its restraining nut in place in the device;

Fig. 2 is a similar view at right angles to Fig. 1;

Fig. 3 is an elevation partly in section, showing a modification;

Fig. 4 is a section on line 5—5 of Fig. 1;

Fig. 5 is a perspective illustrating a restraining nut of semi-cylindrical shape;

Fig. 6 is a perspective view of a spring clip for use with the nut of Fig. 5;

Fig. 7 is a view similar to Fig. 2 but illustrating the modified nut and clip of Figs. 5 and 6; and Fig. 8 is a front elevation of a modified arrangement.

Referring now to the drawings, the male screw-member 1 may be shouldered at 2 for use in the illustrative instance as a projecting gudgeon of a jack-spool having the usual cylindrical wooden barrel 5 having reduced threaded ends 6 on each of which is screwed one of the internally threaded bored spool heads 7. Only one of the two like ends of the jack-spool is shown in Fig. 1. Preferably the head 7 is recessed at 8 for a washer 9, against which the shoulder 2 of the screw-member 1 reacts to hold the parts locked together in use. The screw-member 1 and washer 9 are preferably removable, for example when the spool is to be shipped with its wound contents. The screw-member 1 is mounted in an axial bore of barrel 5, but reliance for anchorage against axial stresses is upon a nut 10 mounted in a transverse bore 11 of barrel 5, and having an internally threaded hole for screw engagement with threaded end 3 of the screw-member 1. The threaded surface of member 1 may be as long as desired; for example, about a third of the length of the whole surface. From time to time it is necessary to set up the tension bolt constituted of the screw-member 1 and nut 10, in order to hold the spool head firmly in place, by turning the screw-member 1 in respect to the nut 10.

In order to retain this adjustment, to provide for assembling and knocking down the spools, and to enable the screw-members 1 to be removed and replaced easily when the spool is wound with yarn, the bolt assembly constituted by members 1 and 10 is provided with means restraining rotary motion of the screw-members 1 in respect to the nut-member 10. In the preferred form shown, the screw-member 1 is cone pointed at 4, and provided with a facet of facets preferably made as opposite flats 12, 12 for engagement with the lips 13, 13 of a resilient clip 15 in surrounding engagement with nut 10, the engagement between nut and clip being such as to prevent one turning on the other.

In a preferred form shown, the clip 15 is a sheet-metal spring bent from a rectangular blank having a hole at 16 for member 1, central in a rectangular area corresponding to the outer face of nut 10, integral parallel projections 17, 17 terminating in the outwardly curved integral lips 13, 13 symmetrically opposite to the center line of the screw-member 1 and adapted to engage the flats 12, 12 of the screw-member 1 beyond the threaded hole in nut 10.

Nut 10 may be assembled with clip 15, which preferably fits tightly on it, and inserted in the transverse hole 11. The nut and clip may be held in central position by friction or otherwise; preferably by plugs, not shown, in the ends of the hole 11.

As shown in Fig. 3 the preferably oblong nut 10 may be bored and threaded on its longer dimension for a set-screw 19, but this is not essential, and is desirable only to prevent inadvertent removal of the member 1, for example when it is intended as a gudgeon, as shown, and the wound spool is not to be shipped, but to be used on the winder's premises. Since the wound mass prevents access to the nut 10, the spool head may not then be tightened or loosened except when the spool is empty between uses.

In Fig. 5 a modified form of nut 18 is illustrated, such nut being of substantially semi-cylindrical shape having the curved surface 19 and the flat surface 19ª and being provided with the internally threaded bore 20 perpendicular to the surface 19ª. For use with this type of nut I employ a clip such as shown in Fig. 6, such clip having the curved upper portion 21 adapted to fit snugly over the curved surface 19 of the nut 18 and having the inwardly directed legs 22 and 23 terminating respectively in the curved lips 24 and 25. This nut and clip are applied to the bolt 1 as indicated in Fig. 7, the lips 24 and 25 engaging the flattened surfaces 12 of the bolt in the same way as the lips 13 of the clip previously described. It is obvious that a nut of this shape may fit more snugly in an ordinarily cylindrical bore in the barrel of the spool than does a nut of usual shape.

In Fig. 8 I have illustrated a further modification in which the nut 26 is provided at opposite sides with spring clips 27 and 28 respectively, such clips being permanently attached to the nut, as for example by spot welding. Each clip has an inwardly directed leg portion 29 and 30 respectively terminating in curved lips 31 and 32 adapted to engage the flattened surfaces 12 of the bolt. This type of nut has the advantage that the nut and clips form a unitary structure so that it is very easy to insert it in the bore in the spool and there is no danger that the clips will be displaced from the nut when the nut is removed from the spool.

I claim:

1. In a bolt assembly, means for restraining relative motion of screw and nut members of the assembly, comprising a resilient clip embracing one of the members, whereby the clip is prevented from turning on the member, said clip having a resilient lip bearing against a facet of the other member, and capable of being displaced by energetic turning motion of the members in respect to each other in either direction.

2. In a bolt assembly, means for restraining relative motion of screw and nut members of the assembly, comprising a resilient clip perforated for the screw-member, embracing one of the members, whereby the clip is prevented from turning on the member, said clip having laterally-extending resilient lips bearing against facets of the other member, and capable of being displaced by energetic turning motion of the members in respect to each other in either direction.

3. In a bolt assembly, the combination of a polygonal nut having a threaded bore with a screw-threaded bolt having facets and a resilient metal clip embracing the nut and perforated for the screw, and having integral spring lips projecting in the axial direction of the screw in position to engage the facets of the bolt and capable of being displaced by energetic turning motion of the members in respect to each other in either direction.

4. In a bolt assembly, a nut longer in one dimension than another, and thereby adapted to seat in a bore-hole in a device adapted to be held together by the bolt assembly, in combination with a threaded bolt adapted to seat in a hole transverse to said bore-hole, a resilient metal clip embracing the nut and having resilient extensions terminating in lips tending to approach on a line parallel to the longer dimensions of the nut, said bolt having facets engaging said lips, the said lips permitting energetic relative turning movement of the bolt in either direction.

Signed by me at Methuen, Massachusetts, this 9th day of September, 1926.

ROBERT N. ALLEN.